United States Patent Office 2,997,486
Patented Aug. 22, 1961

2,997,486
ANTIRACHITIC SUBSTANCES AND PROCESS THEREFOR
Nicholas A. Milas, Belmont, Mass., assignor to Research Corporation, New York, N.Y., a corporation of New York
No Drawing. Filed June 5, 1958, Ser. No. 739,977
9 Claims. (Cl. 260—397.2)

This invention relates to new antirachitic substances and to intermediates and methods of making them.

Heretofore, no biologically active antirachitic products of relatively high activity have been obtained without the use of ultraviolet light or other high energy producing sources to activate the provitamin D intermediates which possess no antirachitic properties. It has now been established that high antirachitic activity is attributable in large part to the stereochemical configurations of the conjugated triene system in which the 5,6-double bond is in a cis-configuration with respect to the exocyclic double bond. This is illustrated in the formula for the natural vitamin $D_3$:

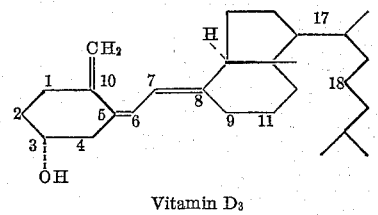

Vitamin $D_3$

In addition to the above requirement for high antirachitic activity the side-chain on carbon atom 17 appears to be essential.

The new antirachitic substances are 1-cholestanylidene-2 - (5' - methoxy - 2' - methylene - 1' - cyclohexylidene)-ethanes which are obtained by condensing 2-cholestanylideneethan-1-al (I) with 4-methoxycyclohexanone (II) under alkaline conditions to produce the cis-(III) and trans-(III') dienones and the disubstitution product (III''), and reacting the dienones with triphenylphosphine methylene IV to give the cis-(V) and trans-(V') Vitamin D homologs of the invention, as illustrated in the following reaction schemes:

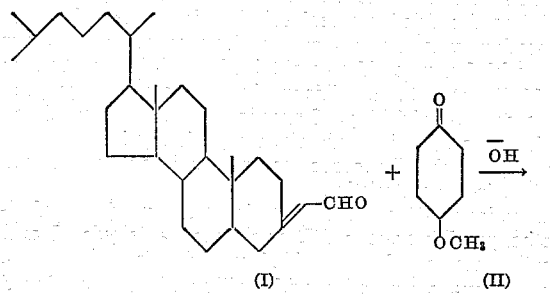

(I) (II)

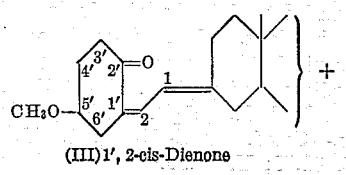

(III) 1', 2-cis-Dienone

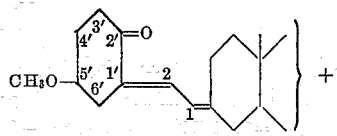

(III') 1', 2-trans-Dienone

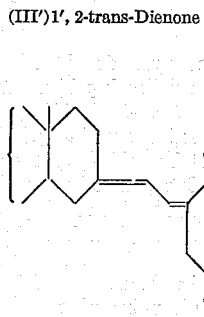

(III'') Disubstitution Product 2,1'-cis-Dienone+Ph₃P⁺—C̄H₂⟶
(III)    IV

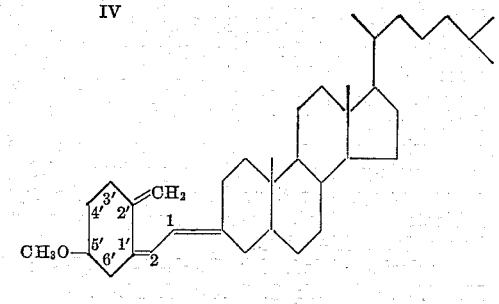

1',2-cis-Homolog of Vitamin D (V)

2,1'-trans-Dienone+
(III)    (IV)

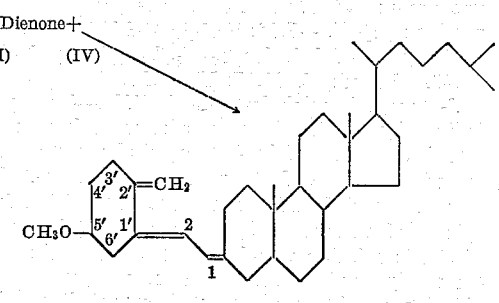

1',2-trans-Homolog of Vitamin D (V')

The 2-cholestanylideneethan-1-al (I) can be made in very good yields by condensing cholestanone (VI) with the Grignard reagent of ethoxyacetylene (VII) to produce 2-ethoxyethynylcholestan-3-ol (VIII) and partially hydrogenating VIII with a palladium catalyst to 3-ethoxyethenylcholestan-3-ol (IX), which is readily converted to the aldehyde (I) by the action of dilute sulfuric acid, as illustrated in the following reaction scheme:

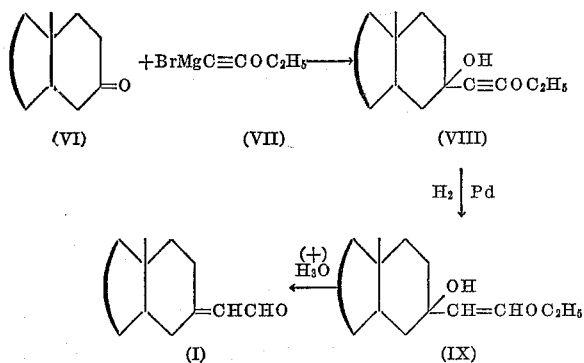

The methods and compounds of the invention are more fully described in the following illustrative examples:

*3-ethoxyethynylcholestan-3-ol (VIII).*—To a Grignard reagent (VI) prepared from 24 g. (0.220 mole) of freshly distilled ethyl bromide and 5.1 g. (0.210 mole) of magnesium in 300 cc. of ether was added dropwise over a period of ½ hour with stirring at 0° C. 16.12 g. (0.230 mole) of ethoxyacetylene in 100 cc. of ether. The mixture was allowed to warm to room temperature, then refluxed gently for ½ hour. At this time, when the ethoxyethynyl magnesium bromide appeared as a heavy black oil finely dispersed in ether, the mixture was rapidly cooled to 0° C. and to it added over a period of one hour 400 cc. of ether solution containing 40.6 g. (0.105 mole) of cholestanone previously subjected to a high vacuum for four hours at 135–140° C. Stirring was continued for 24 hours at room temperature under a slow stream of nitrogen. The mixture was then hydrolyzed at 0° C. with 31.6 g. of tartaric acid in 200 cc. of water and the ether layer separated, washed with water, shaken with a mixture of 300 g. of chromatographic-grade basic alumina and 50 g. of magnesium sulfate, then filtered. The filtrate was further dried with magnesium sulfate, filtered and the ether removed; yield of a pale-yellow amorphous product, 44.0 g. After several recrystallizations from acetone, the crystals were subjected to a high vacuum at room temperature for 24 hours, M.P. 85–86° C.

*Analysis.*—Calcd. for $C_{31}H_{52}O_2 \cdot \frac{1}{2} C_3H_6O$: C, 80.36; H, 11.41. Found: C, 80.44; H, 11.14.

The infrared spectrum of this compound showed a sharp absorption maximum at 1705 cm.$^{-1}$ which disappeared when the compound was subjected to a high vacuum at 64° C. for 24 hours leaving a noncrystalline product; $[\alpha]_D^{25}$, +7.8°; $[M]_D^{25}$, +3600 (in chloroform).

*Analysis.*—Calcd. for $C_{31}H_{52}O_2$ (VIII); C, 81.49; H, 11.49. Found: C, 81.17; H, 11.36.

*3-ethoxyethenylcholestan-3-ol (IX).*—Ten g. of palladium hydroxide (2% on calcium carbonate) catalyst was freshly reduced in 400 cc. of absolute alcohol, 44.0 g. of crystalline 3-ethoxyethynylcholestan-3-ol (XIV) was then added and the mixture allowed to absorb the calculated volume of hydrogen plus 10% excess. The alcoholic solution was filtered through Celite to remove the catalyst and the filtrate diluted with saturated sodium chloride solution and extracted several times with ether. The combined ether extracts were washed with water, dried and the ether removed. The yield was nearly quantitative.

*2-cholestanylideneethan-1-al (I).*—A petroleum ether solution (200 cc.) containing 80.0 g. of 3-ethoxyethenyl-cholestan-3-ol (IX) was shaken for 24 hours in nitrogen with 200 cc. of 2 N sulfuric acid. The organic layer was then separated, washed three times with water, shaken vigorously with 200 g. of alumina (Act. III) and filtered. The alumina was washed several times with fresh portions of ether and the filtrate and washings combined, dried over magnesium sulfate, filtered and the solvent removed to give 73.0 g. of 2-cholestanylidene-ethan-1-al. This was recrystallized from ethanol-water mixture, M.P. 114–115° C.; $[\alpha]_D^{25}$, −9.38°; $[M]_D^{25}$, −3860 (in chloroform); $\epsilon(244.5\ m\mu)$, 30,250 (in ethanol).

*Analysis.*—Calcd. for $C_{29}H_{48}O$: C, 84.39; H, 11.72. Found: C, 84.00; H, 11.82.

This aldehyde gave a strong purplish color with fuchsine reagent and formed a bright-red, 2,4-dinitrophenylhydrazone, M.P. 244–245° C. (chloroform-methanol).

*Analysis.*—Calcd. for $C_{35}H_{51}N_4O_4$: C, 71.04; H, 8.69; N, 9.47. Found: C, 70.71; H, 8.63; N, 9.44.

The UV-spectrum gave an $\epsilon(373\ m\mu)$ of 43040 (in chloroform). The infrared spectrum had the expected bands for the $R_2C=CH-CH=N-$ group at 1620 and 1600 cm.$^{-1}$ respectively.

*Aldol condensation of 2-cholestanylideneethan-1-al (I) and 4-methylcyclohexanone (II).*—To a solution of 700 cc. of t-butyl alcohol containing 4 g. of sodium hydroxide and 10 cc. of water was added, dropwise in the course of one hour with stirring in an atmosphere of nitrogen, a mixture of 7.54 g. (0.0183 mole) of the aldehyde (I) and 4.7 g. (0.0366 mole) of 4-methoxycyclohexanone (II) in 200 cc. of t-butyl alcohol. An additional 100 cc. of t-butyl alcohol was then added and the mixture stirred for 3 hours longer whereby it changed from pale-yellow to orange color. Stirring was continued in nitrogen at room temperature for 24 hours, then the mixture was cooled to 0° C. and treated with 200 cc. of iced-cold solution of tartaric acid containing 15 g. of the latter. The mixture was then extracted several times with ether and the ether extracts combined, washed once with water and dried over magnesium sulfate. The ether treatment of the reaction mixture caused the separation of a bright-yellow precipitate insoluble both in t-butyl alcohol and in ether. This was recrystallized from chloroform-ether mixture; yield, 0.5 g. (6%); M.P. 229.5–230° C. The ultraviolet absorption spectrum of this product showed two prominent bands: $\epsilon(248\ m\mu)$, 15,300; $\epsilon(365\ m\mu)$, 43,200 (in chloroform).

*Analysis.*—Calcd. for $C_{85}H_{104}O_2 \cdot H_2O$: C, 83.64; H, 11.43. Found: C, 83.66; H, 11.42.

Repeated recrystallizations and prolonged drying under high vacuum at elevated temperatures gave the analyses which were consistent for the monohydrate.

An infrared spectrum (10% in CCl$_4$) of this ketone showed the following characteristic bands respectively:

For—
>C=O: 1670, 1230 cm.$^{-1}$;
R$_2$C=CHR: 1625, 1588, 1290, 890, 860 cm.$^{-1}$;
—OCH$_3$: 1150, 1125, 1100 cm.$^{-1}$ (in KBr);
C$_6$H$_{10}$: 970, 940, 910 cm.$^{-1}$.

This ketone is the disubstitution product (III″)

When the dried ethereal solution from the aldol condensation was evaporated to dryness an amorphous yellowish-brown solid was obtained which had an $\epsilon$ value of 11,400 at 300 m$\mu$. This product was chromatographed on a column of 200 g. of alumina (Act. III) and eluted with 400 cc. portions of solvents gradually increasing in polarity. Table I records the various fractions obtained and their characteristics.

Fractions 1–4 were self-condensation products of 4-methoxycyclohexanone III, unchanged aldehyde II and small amounts of unidentified undesirable by-products. By continuous extraction with boiling ethanol fraction 5 was separated into 5A ethanol soluble and 5B ethanol insoluble fractions. The ethanol soluble fraction (0.9395 g.; yield, 10%) was recrystallized from ethanol into pale-yellow needles, M.P. 221–224° C. (dec.) with softening at 200° C.; $[\alpha]_D^{25}$, +86.8° (chloroform).

*Analysis.*—Calcd. for $C_{36}H_{58}O_2$: C, 82.70; H, 11.18. Found: C, 82.73; H, 11.33.

TABLE I

*Chromatography of the aldol condensation products*

| Fraction | Solvent | Wt. (in g.) | Appearance | λmax. (mμ) | $E_{1cm}^{1\%}$ | 2,4-Dinitrophenyl hydrazone | Identity |
|---|---|---|---|---|---|---|---|
| 1 | P.-ether | 1.3326 | Colorless semi-crystalline gum. | 232 240 | 100 326 | Orange | Mixture of self-condensation product of ketone (II) with some aldehyde (I) present. |
| 2 | P.-e:Benzene 9:1. | 0.0690 | White crystalline solid. | 245 | 552 | Red | Aldehyde (I). |
| 3 | P.-e:B 4:1 | 0.0509 | Colorless oil | None | | None | Unknown. |
| 4 | P.-e:B 1:1 | 0.4363 | Yellow Oil | None | | do | Do. |
| 5 | Benzene | 2.0975 | Bright Yellow amorphous solid. | 302 | 347 | Dark-red insoluble in boiling methanol. | Dienone mono-condensation product. |
| 6 | Ethyl ether | 1.4515 | Pale-yellow amorphous solid. | 300 | 224 | Orange, soluble in boiling ethanol water solution. | Probably cis-dienone. |
| 7 | Ethanol | 1.8531 | Dark-yellow amorphous solid. | 298 | 106 | Yellow, soluble in boiling ethanol. | Unknown. |
| 8 | Glacial acetic acid. | 0.8640 | Orange-brown amorphous solid. | 291 | 80 | Yellow, soluble in boiling ethanol-water solution. | Do. |

Ultraviolet absorption spectrum gave an ε (309 mμ) value of 21,000 (ethanol) and ε (302 mμ), 27,200 (ether). Another sample which was obtained in small amounts as a white crystalline solid had an ε (309 mμ), 34,600 (ether). An infrared spectrum of this ketone showed the following characteristic bands respectively (10% in CCl₄):

For—

>C=O: 1674, 1250 cm.⁻¹;
R₂C=CHR: 1614, 1570, 1290, 890, 863 cm.⁻¹;
—OCH₃: 1310, 1190, 1100, 1042, 1028 cm.⁻¹;
—C₆H₁₀: 970, 946, 910 cm.⁻¹.

The 2,4-dinitrophenylhydrazone of this dienone was prepared, M.P. 184° C.

*Analysis.*—Calcd. for C₄₂H₆₂N₄O₄: C, 71.76; H, 8.89; N, 7.97. Found: C, 71.56; H, 8.70; N, 8.56.

The semicarbazone was also prepared, M.P. 220–222° C.

*Analysis.*—Calcd. for C₃₇H₆₂N₃O₂: C, 76.50; H, 10.76; N, 7.23. Found: C, 76.72; H, 10.95; N, 6.94.

In view of the properties shown by the foregoing dienone, it clearly has the 1',2-trans-configuration (III').

The 5B fraction which is insoluble in hot ethanol could not be crystallized from any of the common organic solvents. It was further purified by flushing it with benzene through a column of alumina (Act. III) and removing the benzene under reduced pressure; yield 1.14 g. (12%) of amorphous solid, M.P. 186° C. with softening at 136°; [α]$_D^{25}$, 40.3° (chloroform).

*Analysis.*—Calcd. for C₃₆H₅₈O₂: C, 82.70; H, 11.18; |=, 2.00. Found: C, 82.71; H, 11.07;|=, 1.85 (Pd).

The ultraviolet spectrum showed a prominent band with an ε (307 mμ) of 12,200 (ether). An infrared spectrum showed the following characteristic bands respectively (10% in CCl₄):

For—

>C=1708, 1675, 1250, 1230 cm.⁻¹;
R₂C=CHR: 1615, 1570, 1290 cm.⁻¹;
—OCH₃: 1203, 1190, 1100, 1025 cm.⁻¹.

All attempts to prepare a carbonyl derivative of this dienone were without success because of the steric hindrance usually associated with cis-dienones. The structure which best explains the properties of this dienone, has the 1',2-cis-configuration (III), that is, the same cis-configuration as that present in the natural vitamin D's.

SYNTHESIS OF VITAMIN D HOMOLOGS FROM THE CORRESPONDING CIS- AND TRANSDIENONES (a) *The cis-Homolog (V)*.—In a 300 cc. well dried pressure bottle was placed 0.8 g. (2.2 mmoles) of methyl triphenylphosphonium bromide and to this was added in nitrogen 2.3 cc. of 0.8670 N phenyl lithium (2.0 mmoles) in dry ether followed by a rapid addition of 50 cc. of ether. The bottle was stoppered securely and the mixture shaken at room temperature for 2 days in the dark whereby a bright-yellow solution resulted. To this was then added in nitrogen 1.0 g. (2.0 mmoles) of 1',2-cis-dienone (III), the bottle stoppered and heated in an oil bath for 3 hours at 65–70° C. The mixture was then cooled to room temperature and filtered in nitrogen through a sintered glass filter. In order to hydrolyze the excess reagents, the deep-red filtrate was washed twice with a saturated sodium chloride solution, dried over magnesium sulfate, filtered and the filtrate allowed to stand at —10° C. for 2 days. By filtering this mixture in the cold it was possible to remove all traces of triphenylphosphonium oxide. Finally, the filtrate was evaporated under reduced pressure leaving a yellowish-brown viscous liquid, 0.9880 g. The UV spectrum of this crude product showed the following UV maxima:

$E_{1cm}^{1\%}$ (298 mμ), 153; $E_{1cm}^{1\%}$ (284 mμ), 146;

$E_{1cm}^{1\%}$ (228 mμ), 140; $E_{1cm}^{1\%}$ (272 mμ), 132;

$E_{1cm}^{1\%}$ (262 mμ), 138.

This crude product was taken up in petroleum ether then adsorbed on alumina (Act. III) and eluted successively under nitrogen with 100 cc. portions of solvents according to the following scheme: petroleum ether, petroleum ether-benzene, 99:1, 49:1, 19:1, 9:1, 4:1, 1:1 and finally benzene. Each of these fractions was examined spectroscopically. The chromatographic elutions of petroleum ether-benzene, 19:1, 9:1, and 4:1 were combined and the solvent removed leaving a white amorphous solid, 0.2305 g. (23% yield). This solid had a M.P. 193° (dec.) with softening at 160°; ε (265 mμ), 20,200 (ether). To purify this solid further, it was taken up in a mixture of petroleum ether-benzene 4:1 and flushed in nitrogen through a column of 3.0 g. of alumina. The solvent was evaporated and the white amorphous solid subjected to a high vacuum at 40–50° C. for 48 hours; [α]$_D^{25}$, —10.6° (chloroform).

*Analysis.*—Calcd. for C₃₇H₆₀O: C, 85.34; H, 11.61. Found: C, 84.22; H, 11.55.

The main prominent ultraviolet maximum for this homolog occurred at 267 mµ with an ε value of 31,200 (ether). Other maxima of much lower intensity occurred at 260, 264, 273 and 276 mµ respectively. Like crystalline vitamin $D_3$, this product gives with antimony trichloride in chloroform a pink coloration which shows a prominent maximum at 514 mµ;

$$E_{1\,cm.}^{1\%}, 200$$

The infrared absorption spectrum showed the following characteristic bands respectively (10% in $CHCl_3$):

For—

=$CH_2$: 3100, 1641, 892 cm.$^{-1}$;
$R_2C$=CHR: 1618, 1595, 858 cm.$^{-1}$;
—$OCH_3$: 1185, 1152, 1134, 1095, 1042, 1022 cm.$^{-1}$;
—$C_6H_{10}$: 976, 958, 944, 934 cm.$^{-1}$.

This product (V) was tested biologically on rachitic rats and found to be nearly as active as the crystalline vitamin $D_2$.

(b) *The trans-homolog* (V').—The 1',2-trans-dienone (III') was treated with triphenylphosphinemethylene exactly under the same conditions and concentrations as the 1',2-cis-dienone (III), and after chromatographic treatment of the product formed, the eluent petroleum ether-benzene fractions 99:1 and 49:1 which had similar ultraviolet absorption maxima were combined and the solvent removed to give 0.2738 g. (27% yield) of a colorless gum; ε (272 mµ), 26,400 (ether). The gum was redissolved in 100 cc. of petroleum ether-benzene 49:1 mixture and flushed once in nitrogen through 3 g. of alumina. The solvent was then removed and the residue subjected to a high vacuum at 40–50° C. for 48 hours and analyzed; $[\alpha]_D^{25}$, —39.0° (chloroform).

*Analysis.*—Calcd. for $C_{37}H_{60}O$: C, 85.34; H, 11.61. Found: C, 83.85; H, 11.34.

The main prominent ultraviolet maximum for this homolog occurred at 272 mµ with an ε value of 34,700 (ether). Other maxima of much lower intensity occurred at 262, 265 and 277 mµ respectively. With antimony trichloride in chloroform this homolog also gave a pink color which had an absorption maximum at 512 mµ;

$$E_{1\,cm.}^{1\%}, 159$$

The infrared absorption spectrum showed the following characteristic bands respectively (10% in $CHCl_3$):

For—

=$CH_2$: 3100, 1642, 892 cm.$^{-1}$;
$R_2C$=CHR: 1620, 1596, 859, 844 cm.$^{-1}$;
—$OCH_3$: 1258, 1190, 1092, 1042, 1022 cm.$^{-1}$;
—$C_6H_{10}$: 980, 970, 935 cm.$^{-1}$.

When tested on rachitic rats this homolog (1',2-trans-) was found to be very much less biologically active than either the 1',2-cis-homolog or crystalline vitamin $D_2$.

Both the cis- and the trans-homologs of vitamin D are, like the pure vitamins $D_2$ and $D_3$, not stable to heat, light or oxygen.

I claim:

1. 1-cholestanylidene - 2 - (5' - methoxy-2'-methylene-1'-cyclohexylidene)-ethane.

2. 1',2-cis - 1 - cholestanylidene - 2 - (5' - methoxy-2'-methylene-1'-cyclohexylidene)-ethane.

3. 1',2-trans - 1 - cholestanylidene - 2 - (5' - methoxy-2'-methylene-1'-cyclohexylidene)-ethane.

4. 2-cholestanylideneethan-1-al.

5. In the production of 1-cholestanylidene-2-(5'-methoxy-2'-methylene - 1' - cyclohexylidene)-ethane the step which comprises condensing 2-cholestanylideneethan-1-al with 4-methoxycyclohexanone in alkaline solution under an inert atmosphere.

6. In the production of 1-cholestanylidene-2-(5'-methoxy-2'-methylene - 1' - cyclohexylidene)-ethane the step which comprises reacting the condensation product of 2-cholestanylideneethan-1-al and 4-methoxycyclohexanone obtained by the method of claim 5 with triphenylphosphine methylene at about 65–70° C.

7. In the production of 1-cholestanylidene-2-(5'-methoxy-2'-methylene - 1' - cyclohexylidene)-ethane the step which comprises condensing cholestanone with the Grignard reagent of ethoxyacetylene in ether solution to produce 3-ethoxyethynylcholestan-3-ol.

8. In the production of 1-cholestanylidene-2-(5'-methoxy-2'-methylene - 1' - cyclohexylidene)-ethane the step which comprises reducing the triple bond of 3-ethoxyethynylcholestan-3-ol to a double bond by hydrogenating in the presence of a palladium catalyst.

9. In the production of 1-cholestanylidene-2-(5'-methoxy-2'-methylene - 1' - cyclohexylidene)-ethane the step which comprises converting 3-ethoxyethenylcholestan-3-ol to 2-cholestanylideneethan-1-al by treatment with dilute sulfuric acid.

References Cited in the file of this patent

Milas et al., J.A.C.S., vol. 79, 3610–11 (1957).
Milas et al., J.A.C.S., vol. 80, 2189–94 (May 5, 1958).